Jan. 29, 1957  J. C. OWENS  2,779,350
QUIET ANTI-SIPHONIC FLOAT ACTUATED VALVE
Filed April 3, 1953  2 Sheets-Sheet 1

INVENTOR,
JESSE C. OWENS
BY
ATTORNEY

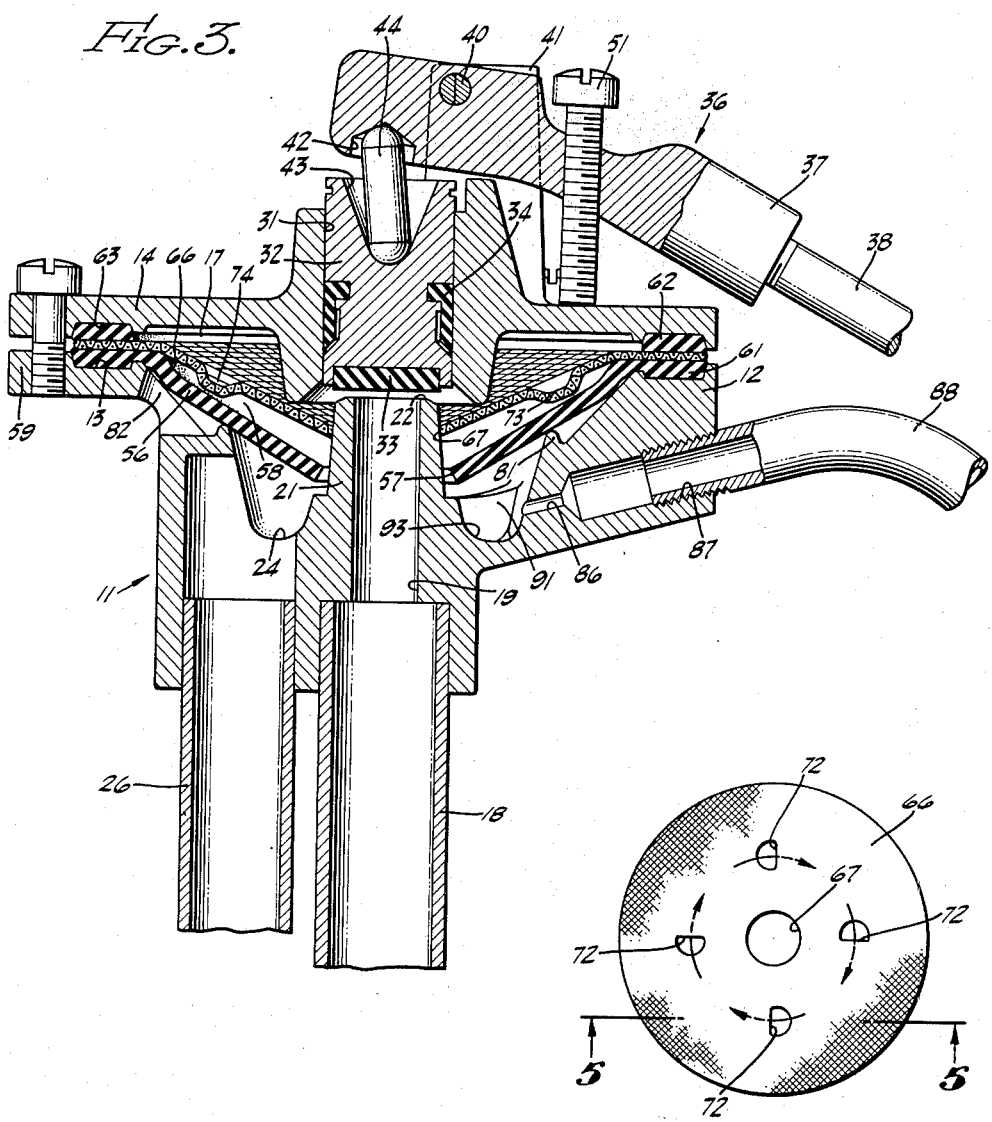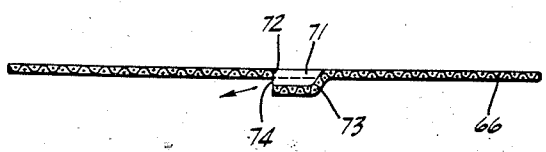

United States Patent Office 2,779,350
Patented Jan. 29, 1957

2,779,350

QUIET ANTI-SIPHONIC FLOAT ACTUATED VALVE

Jesse C. Owens, Los Angeles, Calif.

Application April 3, 1953, Serial No. 346,598

3 Claims. (Cl. 137—218)

This invention relates to float actuated valves of the type commonly employed to cause a storage tank, such as a toilet flushing tank, to be refilled to a predetermined level whenever all or part of the tank's contents is withdrawn. This is the type of valve commonly identified in the plumbing trade as a "ball cock."

An object of the present invention is to provide an "anti-siphonic" construction in an automatic tank refilling valve of the general character indicated, which meets the requirements of the building ordinances enforced in many communities to assure against reversal of flow of contaminated water, from within the storage tank back into the service pipes, as when interruption of water pressure within the latter results in the development of a partial vacuum therein.

Another object in this connection is to provide an "anti-siphonic" construction in an automatic valve as described, which constitutes an improvement over those incorporated in more conventionally constructed valves, as well as that forming the subject-matter of my co-pending application, Serial No. 232,125, filed June 18, 1951, now Patent No. 2,655,172, granted Oct. 13, 1953, because of its being adapted to close off communication between the anti-siphonic air vents and the water passages within the valve whenever the valve is open and operating to refill the storage tank, thus serving effectually to quiet the operation of the valve by preventing intermingling of air with the water flowing through the valve and from the valve into the storage tank.

Another object of this invention is to design and construct the element which closes off the anti-siphonic air vents while the valve is open, as described, in such a manner that when the valve is closed and flow of water therethrough is discontinued, it not only moves to a position wherein the anti-siphonic air vents are operated to assure maintenance of atmospheric pressure within the valve body and thereby prevent development of the partial vacuum therein which would be required for development of the siphoning action which otherwise might draw water back from the storage tank into the service pipes, but it also establishes a positive, mechanical seal between the valve's inlet port and the "hush-tube" or other tube whereby water is delivered from the valve body downward into the storage tank.

A further object in this connection is to design and construct the valve in such a manner that when the hereinabove referred to mechanical seal is established, a substantial quantity of water is entrapped, further assuring the mechanical efficiency of the anti-siphonic seal.

Another object of my present invention is to provide, as an additional, co-operative feature enchancing the sound-reducing characteristics of the present refilling valve, a partition of foraminated material, or wire mesh screen, through which water must flow during its passage through the valve housing, so as to break up any high velocity jets or eddy currents which otherwise would be apt to cause the hissing and whistling noises which are such an objectional characteristic of more conventional toilet storage tank refilling valves.

A further object in this connection is to provide the foraminous partition with means for imparting a whirling motion to the water passing therethrough, thereby further reducing tendency for the water to hiss and whistle during its flow through relatively restricted passages in the valve and its delivery tube.

Yet another object of the present invention is to provide means for providing and maintaining a water-seal closing off the secondary delivery tube, or "refill tube" so as to prevent air from being drawn back into the housing of the valve during periods of water-flow therethrough.

A still further object is to provide novel and unusually efficient means for actuating the plunger, or main control element of the valve, in such a manner that it moves relatively rapidly in proportion to the rate of movement of its actuating lever, while separated from its valve seat, but it moves at a relatively slow rate in proportion to that of its actuating lever as it approaches its seat, with a corresponding increase in mechanical advantage assuring pressure of the valve against its seat so firmly that danger of leakage when the valve is in its closed position is minimized.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description as I may adopt variations of the preferred form within the scope of my invention as set forth in the claims.

Referring to the drawings:

Figure 3 is a view similar to Fig. 2, but showing the parts in the respective positions assumed thereby when the valve is open and the water is flowing through the valve to the storage tank.

Figure 4 is a top plan view of the screen silencing partition constituting one of the novel and important features of the valve of my present invention, but showing the partition while still flat and prior to its being pressed to conical configuration.

Figure 5 is a slightly enlarged detail view in transverse vertical section, taken upon the line 5—5 of Fig. 4 with the direction of view as indicated.

Figure 6:
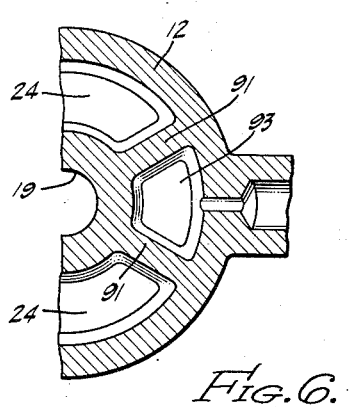
Figure 6 is a detail view in horizontal section, taken upon the line 6—6 of Fig. 2, with the direction of view as indicated, and with a portion of the figure broken away to reduce its size.
Figure 1:
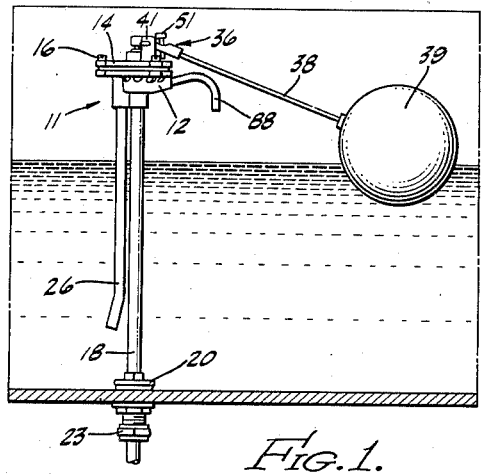
Figure 1 is a view in side elevation of a "ball cock" or storage tank refilling valve incorporating the principles of the present invention and indicating its manner of mounting within a toilet flushing tank.

In the preferred embodiment of the float actuated storage tank refilling valve of the present invention which has been chosen for illustration and description herein, there is provided a housing 11 comprising a base or bottom portion 12 having a recess 13 in its upper surface, which recess is closed by a cap 14 rigidly but removably secured to the bottom 12 as by a plurality of screws 16. Consequently, the bottom 12 and cap 14 cooperate to define a substantially closed chamber 17 within the housing 11.

Flow of water to the valve housing is provided for by means of an inlet tube 18, the upper end of which is secured to the bottom 12 of the housing in communication with an inlet port 19 which leads through the bottom 12 and into the interior thereof, thus providing for the flow of water into the chamber 17. The supply tube 18 is provided, adjacent its lower end, with means 20, preferably conventional, for rigidly securing it to the bottom wall of a toilet storage tank through which the tube 18 extends, and also with means 23, also preferably conventional, for connecting the tube 18 to a service pipe adapted to provide water under pressure.

The port 19 leads from the upper end of the supply tube 18 through the bottom of the housing 12, as hereinabove mentioned, and preferably coaxially through an upstanding nipple 21 which extends for a substantial distance above the inner surface of the bottom wall of the base portion 12 of the housing 11. Consequently, the nipple 21 disposes an annular valve seat 22 at substantial elevation above the bottom wall, and it also cooperates with the side wall of the base portion 12 in presenting an annular pocket 24 surrounding the base of the nipple 21. It is from this pocket 24 that the valve's delivery tube 26 extends downward. This delivery tube is commonly called the "hush tube" inasmuch as it provides for the smooth and quiet flow of water from the valve to the interior of the storage tank within which the valve is mounted.

A cylindrical guide-way 31 is formed in the cap 14 above and in coaxial alignment with the nipple 21 so that a plunger 32 reciprocably mounted within the guide-way 31 can, when moved downward, press a disc 33 of resilient, sealing material against the valve seat 22 and thus close off flow of water from the supply tube 18 to the chamber 17 within the housing 11. Preferably, this plunger 32 is provided with one or more rings 34, or packing, to prevent leakage between the walls of the guide-way 31 and the plunger 32.

Figure 2:
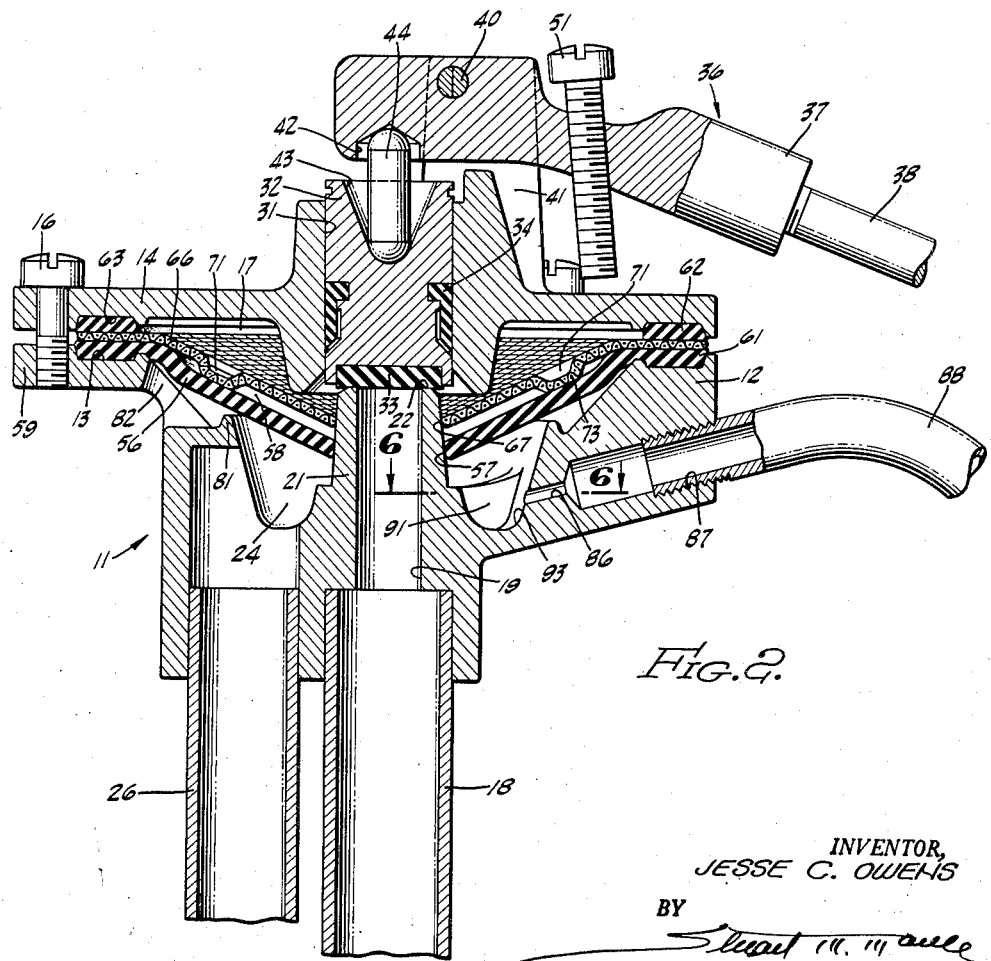
Figure 2 is a vertical, medial sectional view of a storage tank refilling valve incorporating the principles of the present invention. The parts are shown in the respective positions assumed thereby when the valve is closed and flow of water therethrough is stopped.

The means for actuating the plunger 32 to force it into valve-closing position comprises a lever 36 to one end 37 of which the rod 38 of a ball float 39 is firmly attached. This lever is pivotally mounted, as by means of a transversely extending cotter pin 40 between preferably two upstanding pillars 41 rigid and preferably integral with the cap 14. The axis of this pivotal mounting is within a plane perpendicular to the axis of reciprocation of the plunger 32 and offset to one side thereof, for example, to the right as illustrated in Figs. 2 and 3. A recess 42 is formed in the under surface of the other end of the lever 36; and another, substantially coaxially aligned recess 43 is provided in the upper end of the plunger 32. These two recesses 42 and 43 accommodate the upper and lower ends, respectively, of a pin 44, both these ends of the pin 44 being preferably rounded so that they seat within their respective sockets or recesses 42 and 43 in such a manner that they can pivot freely with respect to the lever 36 and plunger 32 and thus permit the rocking motion of the pin 44 with respect to the plunger 32 which is coincident with downward motion of the plunger 32 and pin 44 as induced by rotary motion of the lever 36 in a counter-clockwise direction, as viewed in Figs. 2 and 3, about the axis of the cotter pin 40.

The parts are so proportioned and arranged that the axis of such rocking motion of the pin 44 with respect to the lever 36 is offset to the left, as viewed in Figs. 2 and 3, from the plane which includes the axis of such rocking movement of the lower end of the pin 44 with respect to the plunger 32, and such plane also includes the axis of pivotal motion of the lever 36 about the cotter pin 40. Moreover, the axis of rotary motion of the pin 44 with respect to the lever 36 is substantially at the midpoint between the axis of the cotter pin 40 and the axis of rotary motion associated with the lower end of the pin. Consequently, as the plunger 32 approaches its lower extreme of motion, as induced by rotary motion of the lever 36 in counter-clockwise rotation about the axis of the cotter pin 40, the upper end of the pin 44 is, in addition to being pushed downward, drawn to the right, as viewed in Figs. 2 and 3, thus drawing the upper end of the pin 44 more closely to the plane, hereinabove described, which includes the axis of rocking motion associated with the lower end of the pin and also the axis of the cotter pin 40. Consequently, as the plunger 32 approaches its valve-closing position, it moves more slowly and thereby develops a mechanical advantage, and causes the sealing disc 33 to be pressed against the valve seat 22 with considerably greater force in proportion to the force developed by the lever 36. On the other hand, when the plunger 32 is at a position more distant from its lower extreme of motion, the plunger moves at a rate considerably more rapid in proportion to the rate of movement of the lever 36, thus making for more complete opening of the valve disc 33 and greater freedom of flow of water between it and the valve seat 22.

Preferably, the lever 36 is provided with an adjusting screw 51 threaded therethrough in position to engage the cap 14 and thereby limit the extent of rotary motion of the lever 36 in that direction which results in opening of the valve. In this manner the extent of opening of the valve can be limited in at least partial compensation for excessively high pressure of water within the supply or service pipe.

Within the housing 11 there is provided a partition 56 of resilient, flexible material, preferably "Neoprene" rubber. This partition 56 is in the form of a washer or diaphragm having a central opening 57 through which the nipple 21 extends. This opening 57 is of such diameter that it fits closely and snugly against the preferably slightly tapered outer surface of the nipple 21 with sufficient security to establish a dependable fluid-seal therewith. Moreover, the diaphragm 56 instead of being flat, is preferably disc-shaped to provide a recess 58 in its concave upper surface, which recess 58 serves as a reservoir within which a substantial quantity of water is entrapped when the valve is closed and flow therethrough is stopped. This water serves to further enhance the efficiency of the seal established between the inner circumference of the partition 56 and the outer surface of the nipple 21. The partition 56 is clamped in position by having its outer peripheral edge engaged between the flange 59 provided at the upper and outer portions of the base 12 of the housing, and the corresponding portions of the cap 14. Preferably an enlarged bead 61 is provided upon the outer peripheral edge of the partition 56 to aid in such clamping; and a co-operative gasket 62 is seated within a complementarily shaped groove 63 in the under surface of the cap 14, which operates toward this same end.

There is also provided a silencer screen 66 extending across the housing just above the partition 56. This silencer screen 66 is similarly mounted, i. e., by having its outer peripheral edge gripped between the gasket 62 and the peripheral edge of the partition 56. Moreover, a central opening 67 is also provided in the screen 66 through which the nipple 21 extends in closely fitting relationship. Consequently, any water flowing from the inlet port 19 and through the housing 11 to the discharge tube 26 must flow through the screen 66 during its passage through the housing. This tends to break up any jets and/or eddies of high velocity which might otherwise tend to produce the objectionable hissing and whistling noises which characterize more conventionally constructed toilet tank's refilling valves.

The ability of this screen partition 66 to eliminate noise of the water in flowing through the valve is enhanced by the presence of a plurality of openings 71. Each of these openings 71 is formed by a single radially extending cut or slit 72 (see Figs. 4 and 5) with the portion of the screen immediately adjacent and on one side of the slit deflected downwards to present a hood 73 below the opening 71 thus formed and having a laterally extending aperture 74 at the end of the hood 73 which is defined by the cut 72. All of these laterally directed openings 74 face in a common direction about the central axis of the valve housing; for example, as illustrated in Fig. 4, they all open in a clockwise direction. Consequently, they develop a tendency to impart a whirling motion to the water flowing through the screen partition 66, enabling the water to flow between the relatively restricted space between the inner circumferential edge of the partition 66 and the outer surface of the nipple 21, in accordance with the description to follow herein below.

An annular ridge or bead 81 is provided, upstanding from the inner surface of the base portion 12 of the housing 11 in such position that when the impervious partition 56 is flexed downward slightly it engages the ridge 81 in a continuous circle of contact disposed coaxially with respect to the nipple 21 and substantially midway between the nipple 21 and the outer circumferential edge of the partition 56. Fig. 3 illustrates the parts in such engagement. The base portion 12 of the housing 11 is also provided with preferably a plurality of air inlet vents 82 establishing communication between the atmosphere and the housing's interior chamber 17 below the partition 56 but above the annular ridge 81.

The base portion 12 of the housing 11 is also provided with an auxiliary or secondary outlet 86 which inclines upwards and outwards from a position adjacent the bottom of the pocket 24. The outer portion of this outlet 86 is preferably enlarged and provided with threads 87 to permit attachment of an auxiliary outlet tube 88 thereto. This auxiliary outlet tube 88, in the conventional toilet installation, is called the "refill tube" inasmuch as it assures that at least a small quantity of water will remain in the bottom of the toilet bowl after the flushing operation has been completed by maintaining flow thereto while the storage tank is being refilled. A radially extending partition 91 is provided upon each side of the auxiliary outlet opening 86, extending across the bottom of the pocket 24 from the base of the nipple 21 to the inner surface of the side wall of the base portion 12. These partitions co-operate to define a small reservoir 93 adapted to entrap and retain a sufficient quantity of water to seal off the inner end of the auxiliary outlet opening 86 after the refilling operation of the valve has ceased. Were it not for the presence of these partitions 91 defining the reservoir 93, all water entering the annular pocket 24 would be drained off through the "hush tube" 26 inasmuch as the "hush tube" leads from the very bottom of the pocket 24; but by retaining a small quantity of water within the reservoir 93 sealing off the inner end of the auxiliary discharge opening 86, not only is an efficient water seal provided for the refill tube, but also the tendency for any air to be drawn into water flowing through the main valve during the tank's refilling operation is prevented.

*Operation*

When the level of the water within the tank drops, the ball float 39 will be lowered, raising the end of the lever 36 and permitting the plunger 32 to be lifted so as to withdraw the sealing disc 33 from the valve seat 22. This will permit water under pressure to enter the chamber 17 above the foraminous screen 66. When the water flows through the screen it has a swirling motion imparted thereto, as hereinabove described, so as to eliminate, or at least minimize the tendency for the relatively high pressure water to develop objectionable noises. By being permitted to flow freely through the screen 66 the water develops sufficient hydrostatic pressure upon the upper surface of the impervious partition 56 to deflect its central, lower portion downward, substantially to the position illustrated in Fig. 3. Such downward motion of the central portion of the partition 56, sliding along the outer circumferential wall of the nipple 21, is accompanied by stretching and consequent enlargement of the partition's central opening 57, thereby presenting an annular space between the inner circumference of the partition 56 and the outer wall of the nipple 21. Water under pressure is thus permitted to flow past the partition 56 into the pocket 24 and thence to the interior of the storage tank to which the "hush tube" 26 leads.

However, as is also indicated in Fig. 3, such downward motion of the partition 56 causes it to seat against the top of the ridge 81, closing off all communication between the pocket 24 and the aperture through the antisiphonic air inlet vent 82. Thus it may be seen that as the water flows through the valve in its tank-refilling operation, the water is kept free of air bubbles which would otherwise develop the tendency to produce bubbling and gurgling noises which are an objectionable characteristic of more conventionally constructed tank-refilling float valves.

Furthermore, the water seal for the refill tube 88 is another feature which co-operates with the inter-engaging annular bead 81 and the under surface of the diaphragm 56, in preventing intake of air to the chamber 17 while the valve is open and water is passing therethrough in the tank-refilling operation.

However, after the tank has been filled to the desired level, raising the ball float 39 to its upper extreme of movement, the end of the lever 36 will be swung downward pressing the plunger 32 downwards to the disc 33 against the valve seat 22, thereby closing off the flow of water from the inlet tube 18 to the interior of the chamber 17. This, of course, will cause a flow of water through the annular space between the inner peripheral edge of the diaphragm 56 and the nipple 21 to cease. The inherent contractile resiliency of the material of which the diaphragm 56 is composed will then be enabled to cause the stretched diaphragm 56 to contract, raising its inner peripheral edge 57 until it again makes sealing contact with the nipple 21 and thereby effectually preventing flow of air upward past the diaphragm 56 to reach the upper end of the nipple 21. As hereinabove explained, the efficacy of this seal between the diaphragm 56 and the nipple 21 is enhanced by the entrapment of a substantial quantity of water above this diaphragm 56 and in contact with the portion of the nipple 21 which is above the diaphragm. This water will be entrapped because of the fact that the diaphragm 56 will rise and contract as the pressure of the water thereabove diminishes and thereby establish the seal between itself and the nipple before all of the water which previously has passed the valve seat 22 has had opportunity to flow down through the central opening of the diaphragm.

This positive mechanical seal between the diaphragm and the nipple would be effective in preventing the flow of any water from the hush tube 26 back into the service pipe 23 in the event that a partial vacuum should develop in the latter, even were the valve of the present invention not provided with efficient anti-siphonic means preventing water from being drawn upwards in the hush tube 26. It, therefore, constitutes an added safety feature preventing contamination of water within the service pipes in the event of failure of pressure therein. But the principal feature of this present valve in preventing such contamination of water within the service pipes is the establishment of communication between the bowl 24 into which the upper end of the hush tube 26 leads, and the atmosphere through the several air inlet vents. This communication is established across the top of the annular bead 81 when the diaphragm 56 rises to its position illustrated in Fig. 2, as hereinabove described. When water ceases to flow downward past the diaphragm 56 to the bowl 24, all of the water within the bowl 24 except that entrapped within the reservoir 93 between the two radial partitions 91 will drain off through the hush tube 26 into the storage tank, thus maintaining a water seal for the inner end of the refill tube while the valve is actually operating to refill the storage tank; and of course even were the reservoir 93 completely empty at the beginning of the refilling operation, flow of water through the valve at the beginning of the refilling operation will instantly fill the reservoir and thus prevent flow of air into the housing and thereby co-operative with the bead 81 in preventnig any bubbles of air forming within the water being delivered through the hush tube 26 to the storage tank. The reservoir 93 is, therefore, an important detail in maintaining the quietness of operation of the present valve which is one of its principal advantageous characteristics.

Toward this same end, the foraminous screen or partition 66 prevents the whistling and hissing noises which otherwise would be apt to develop as the result of the passage of water at high pressure and velocity through the valve structure, particularly because of the presence of the several openings 71 and their respectively associated hoods 73, which impart a whirling motion to the water above the diaphragm 56 flowing through the opening 57.

I claim:

1. A storage tank supply valve comprising a housing defining a substantially closed chamber and having an inlet port opening upwards through the bottom of said housing, a tubular nipple encircling said port and extending upwards within said chamber to a position above the bottom of said chamber, a valve seat on the upper end of said nipple, a plunger mounted in said housing for reciprocatory movement toward and away from said valve seat, means for moving said plunger, said housing having an outlet leading from said chamber below said valve seat, and a foraminous screen extending across said chamber and having an aperture therein through which said nipple extends, whereby any liquid passing through said chamber from said inlet port must pass through said screen before reaching said outlet, said screen having a plurality of radial cuts therein and the portion of said screen immediately adjacent each of said cuts and on one side thereof being deflected from the plane of said screen to define a hood opening in a direction perpendicular to the associated cut, all of said hood openings facing in a common direction about the central axis of said nipple whereby a whirling motion is imparted to said water after it flows through said screen.

2. A storage tank supply valve comprising a housing defining a substantially closed chamber and having an inlet port opening upwards through the bottom of said housing, a tubular nipple encircling said port and extending upwards within said chamber to a position above the bottom of said chamber, a valve seat on the upper end of said nipple, a plunger mounted in said housing for reciprocatory movement toward and away from said valve seat, means for moving said plunger, said housing having an outlet leading from said chamber below said valve seat, a foraminous screen extending across said chamber and having an aperture therein through which said nipple extends, whereby any liquid passing through said chamber from said inlet port must pass through said screen before reaching said outlet, said screen having a plurality of radial cuts therein and the portion of said screen immediately adjacent each of said cuts and on one side thereof being deflected from the plane of said screen to define a hood opening in a direction perpendicular to the associated cut, all of said hood openings facing in a common direction about the central axis of said nipple whereby a whirling motion is imparted to said water after it flows through said screen, and a check valve interposed between said inlet port and said outlet in co-operative association with said nipple to permit flow from said port to said outlet but to check flow from said outlet to said port.

3. A storage tank supply valve comprising a housing defining a substantially closed chamber and having an inlet port opening upwards through the bottom of said housing, a tubular nipple encircling said port and extending upwards within said chamber to a position above the bottom of said chamber, a valve seat on the upper end of said nipple, a plunger mounted in said housing for reciprocatory movement toward and away from said valve seat, means for moving said plunger, said housing having an outlet leading from said chamber below said valve seat, a foraminous screen extending across said chamber and having an aperture therein through which said nipple extends, whereby any liquid passing through said chamber from said inlet port must pass through said screen before reaching said outlet, said screen having a plurality of radial cuts therein and the portion of said screen immediately adjacent each of said cuts and on one side thereof being deflected from the plane of said screen to define a hood opening in a direction perpendicular to the associated cut, all of said hood openings facing in a common direction about the central axis of said nipple whereby a whirling motion is imparted to said water after it flows through said screen, and a check valve comprising a resiliently flexible diaphragm of impervious material sealed to said housing throughout its outer periphery and extending radially inwards therefrom to a central opening through which said nipple extends, said diaphragm normally establishing sealing engagement with said nipple to check flow upwards along the exterior of said nipple, but being adapted to be flexed downward in response to fluid pressure against its upper surface and simultaneously stretched to enlarge said central opening and thereby permit flow from above said diaphragm to said outlet, said housing having an air vent establishing communication between the atmosphere and said chamber above said outlet and below said diaphragm, and means sealing off the portion of said chamber with which said vent communicates from the portion of said chamber from which said outlet leads when said diaphragm is flexed in response to fluid pressure against its upper surface.

References Cited in the file of this patent

UNITED STATES PATENTS

| Number | Name | Date |
|---|---|---|
| 483,172 | Schrader | Sept. 27, 1892 |
| 910,874 | Sinclair | Jan. 26, 1909 |
| 1,144,040 | Keller | June 22, 1915 |
| 2,017,799 | Helfrich | Oct. 15, 1935 |
| 2,032,064 | Meng | Feb. 25, 1936 |
| 2,065,161 | Thompson | Dec. 22, 1936 |
| 2,155,520 | Wolff | Apr. 25, 1939 |
| 2,167,938 | Clemmons | Aug. 1, 1939 |
| 2,317,923 | Lebo | Apr. 27, 1943 |
| 2,318,236 | Layton | May 4, 1943 |
| 2,329,337 | Criss | Sept. 14, 1943 |
| 2,395,906 | Owens | Mar. 5, 1946 |
| 2,491,131 | Owens | Dec. 13, 1953 |
| 2,629,393 | Langdon | Feb. 24, 1953 |
| 2,667,177 | Smith | Jan. 26, 1951 |